United States Patent
Morales

(10) Patent No.: US 11,834,004 B1
(45) Date of Patent: Dec. 5, 2023

(54) VEHICLE BODY STRUCTURE

(71) Applicant: NISSAN NORTH AMERICA, INC., Franklin, TN (US)

(72) Inventor: Daniel Morales, Windsor (CA)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 17/877,860

(22) Filed: Jul. 29, 2022

(51) Int. Cl.
*B60R 5/04* (2006.01)

(52) U.S. Cl.
CPC .................... *B60R 5/044* (2013.01)

(58) Field of Classification Search
USPC ....................................................... 296/37.16
See application file for complete search history.

(56) References Cited

U.S. PATENT DOCUMENTS

| | | | |
|---|---|---|---|
| 8,172,295 B2 * | 5/2012 | Fischer | B60R 5/04 296/37.16 |
| 9,073,488 B1 | 7/2015 | Stanczak et al. | |
| 9,096,178 B1 | 8/2015 | Stanczak et al. | |
| 10,059,269 B2 * | 8/2018 | Herman | B60R 13/0237 |
| 10,106,089 B2 * | 10/2018 | Herman | B60R 5/045 |

* cited by examiner

*Primary Examiner* — Joseph D. Pape
(74) *Attorney, Agent, or Firm* — Global IP Counselors, LLP

(57) ABSTRACT

A vehicle cargo area structure has a first wall portion and a second wall portion spaced apart from one another by a first distance. The first wall portion and the second wall portion define respective first and second pairs of slots. Recessed surfaces defined within the first pair of slots are a second distance away from recessed surfaces of the second pair of slots. The second distance is larger than the first distance. A first end a panel has a first pair of projections extending therefrom. A second end of the panel has a second pair of projections extending therefrom. The panel and the first and second pair of projections are dimensioned and shaped such that the panel can be positioned in an upright or vertical orientation, a shelf or horizontal orientation and a stowed orientation.

14 Claims, 8 Drawing Sheets

VEHICLE BODY STRUCTURE

BACKGROUND

Technical Field

The present disclosure generally relates to a vehicle cargo area structure. More specifically, the present disclosure relates to a vehicle cargo area structure that includes lateral opposing walls with slots formed therein and a movable panel having projections extending from opposite ends thereof that fit into the slots for positioning in a plurality of orientations.

Background Information

Cargo areas of vehicles have been provided with a variety of dividers and web-like mesh materials that are removably attachable to fixtures within the structure that defines the cargo area. Often, such dividers and web-like mesh material are awkward and difficult to install and remove.

SUMMARY

One object of the present disclosure is to provide a cargo area with a plurality of aligned slots formed on opposite lateral walls of the cargo area and with a panel having projections that can slide in and out of the slots for ease of installation of the panel to the opposing lateral walls in a plurality of differing orientations without the use of tools or mechanical fasteners.

In view of the state of the known technology, one aspect of the present disclosure is to provide a vehicle body structure with a vehicle cargo area structure and a panel. The vehicle cargo area structure has a first wall portion and a second wall portion. The first wall portion and the second wall portion are spaced apart from one another by a first distance. The first wall portion defines a first pair of slots. The second wall portion defines a second pair of slots. Recessed surfaces defined within each the first pair of slots are a second distance away from recessed surfaces defined within the second pair of slots, the second distance being larger than the first distance. The panel defines a first end and a second end opposite the first end. The first end has a first pair of projections extending therefrom. The second end has a second pair of projections extending therefrom. The panel and the first and second pair of projections being dimensioned and shaped such that the first and second pair of projections of the panel are removably installed within at least one of the first pair of slots and the second pair of slots in a plurality of orientations including a horizontal orientation and an upright orientation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
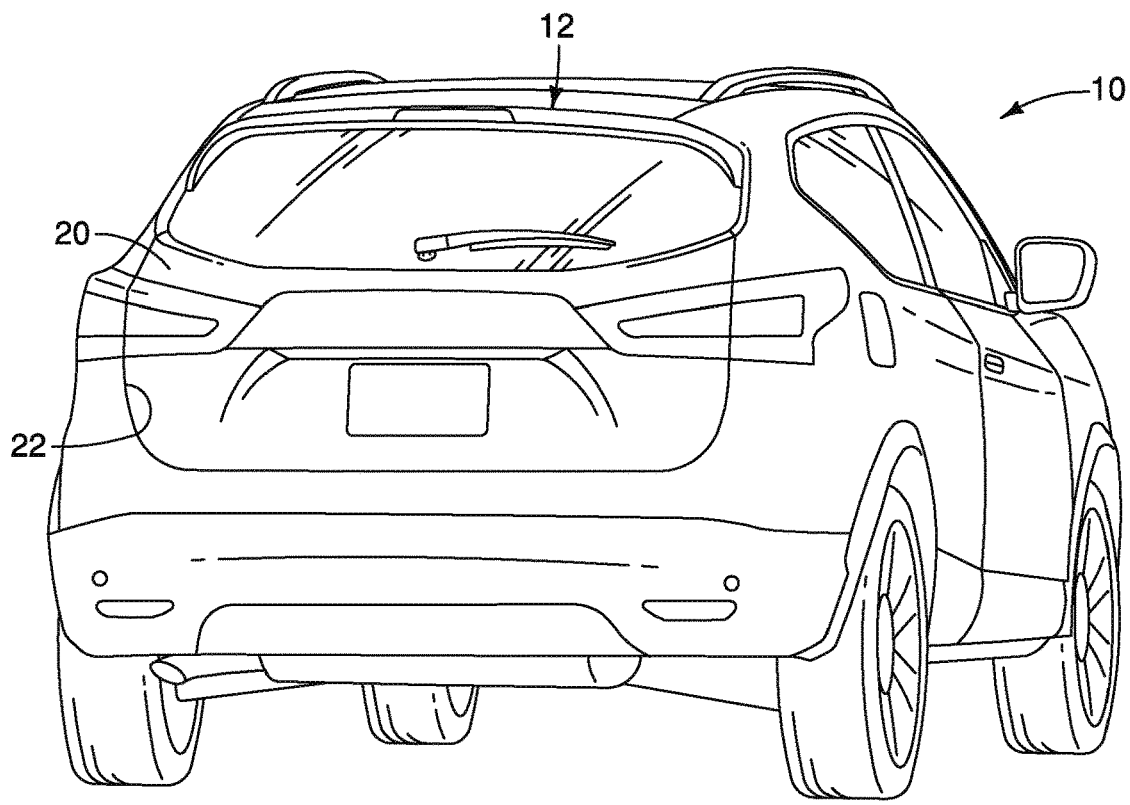
FIG. 1 is a rear perspective view of a vehicle showing vehicle body structure and a rear door that covers and conceals a cargo area defined within the vehicle body structure in accordance with a first embodiment.
Figure 2:
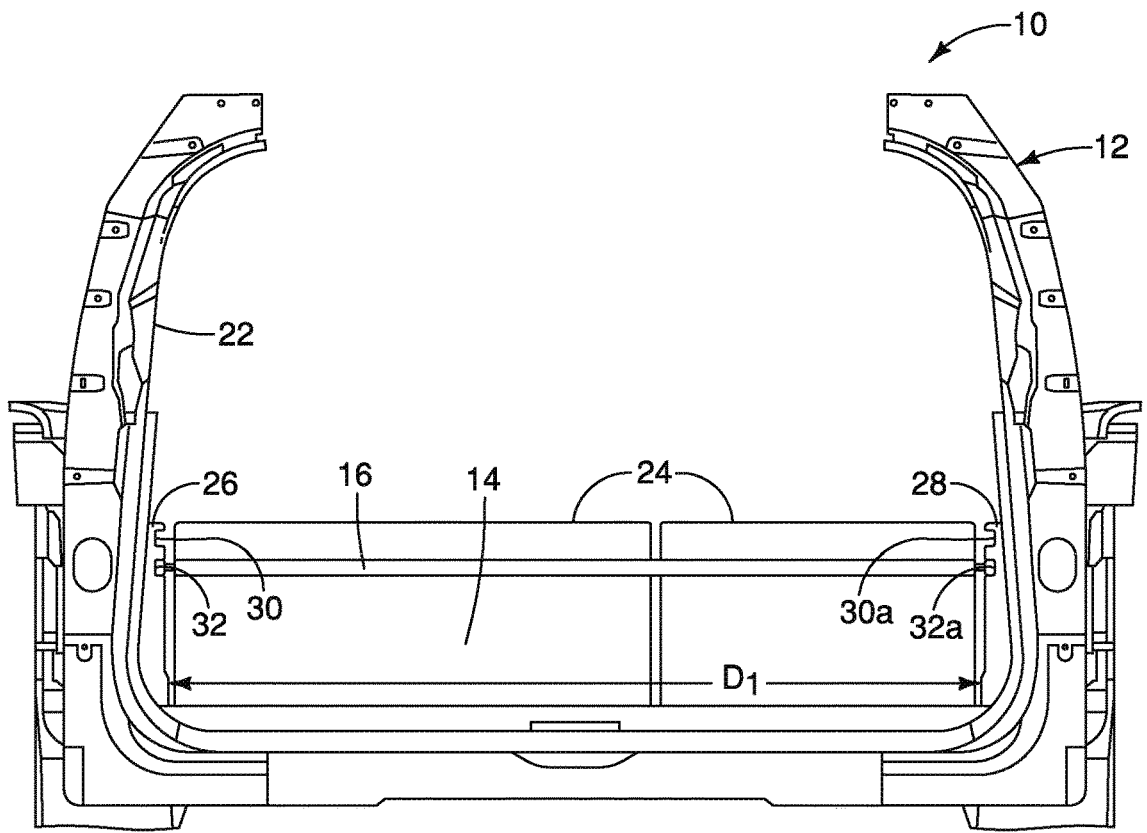
FIG. 2 is a rear view of a portion of the vehicle body structure with the rear door removed showing the cargo area, a first wall portion, a second wall portion, rear seats and a panel that is removably installed to slots form along the first and second wall portions, the panel installed between the first and second wall portions in a horizontal or shelf orientation in accordance with the first embodiment.

Referring initially to FIGS. 1 and 2, a vehicle 10 that includes a vehicle body structure 12 with a cargo area 14 and a panel 16 that is moveable between a plurality of differing orientations within the cargo area 14, is illustrated in accordance with a first embodiment.

The vehicle body structure 12 of the vehicle 10 has a rear door 20 (FIG. 1) that covers an opening 22 leading to the cargo area 14 (FIG. 2). The cargo area 12 is defined within an area of the vehicle body structure 12 rearward of a rear seat 24.

Figure 5:
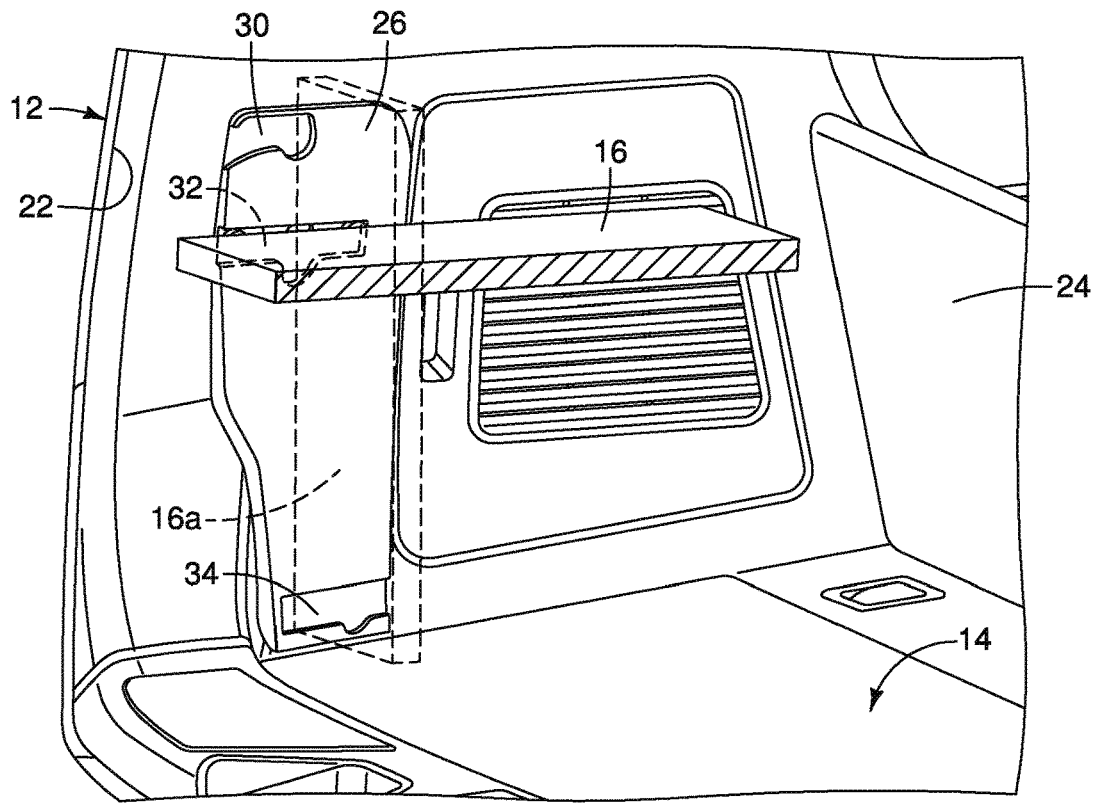
FIG. 5 is a perspective view of the portion of the cargo area showing the first side wall portion having a first slot, a second slot and a third slot with a first end of the panel shown in the horizontal orientation (solid lines) and the upright or vertical orientation (phantom lines) in accordance with the first embodiment.

The portion of the vehicle body structure 12 that defines cargo area 14 includes a first wall portion 26 and a second wall portion 28. Hence, the cargo area 14 is confined between the rear door 20, the first wall portion 26, a second wall portion 28 and the rear seat 24, with the rear seat 24 in a seating orientation as shown in FIGS. 2 and 5. It should be understood from the drawings and the description herein that the cargo area 14 can optionally be increased in size with the lowering of the rear seat 24 to a cargo expanding orientation.

Figure 3:
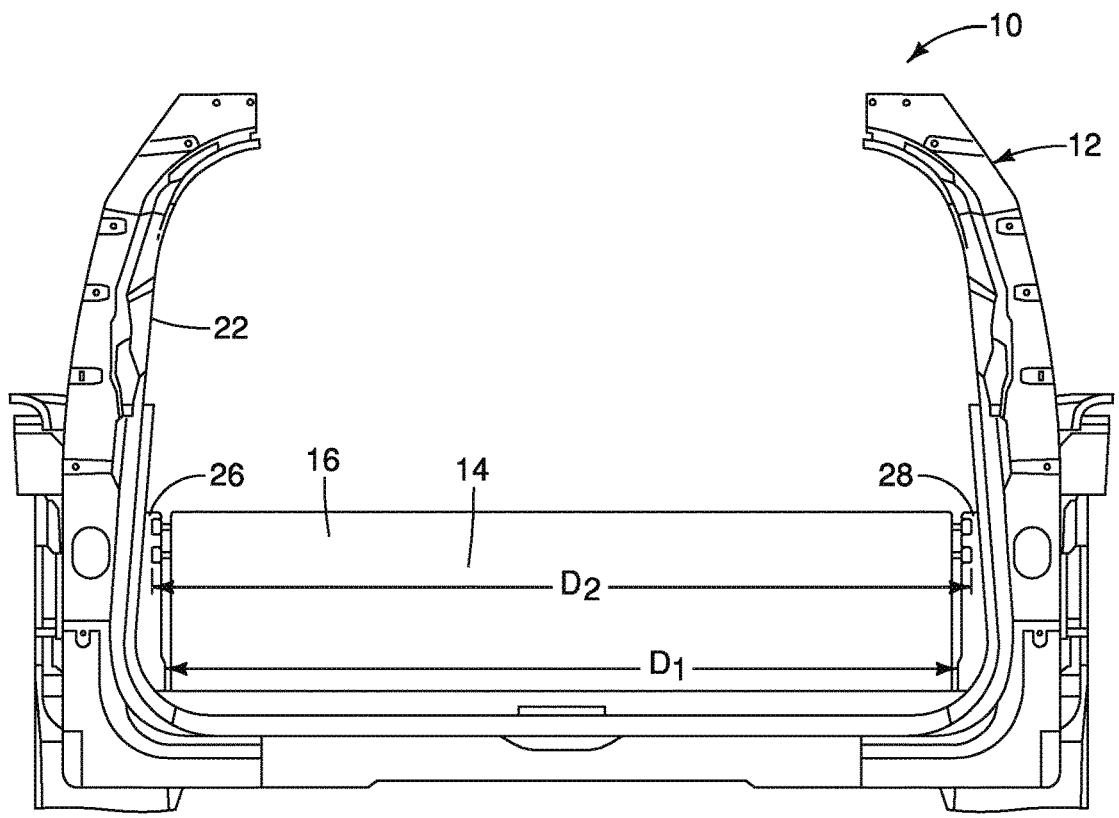
FIG. 3 is another rear view of the portion of the vehicle body structure similar to FIG. 2 showing the panel installed between the first and second wall portions in an upright or vertical orientation in accordance with the first embodiment.
Figure 4:
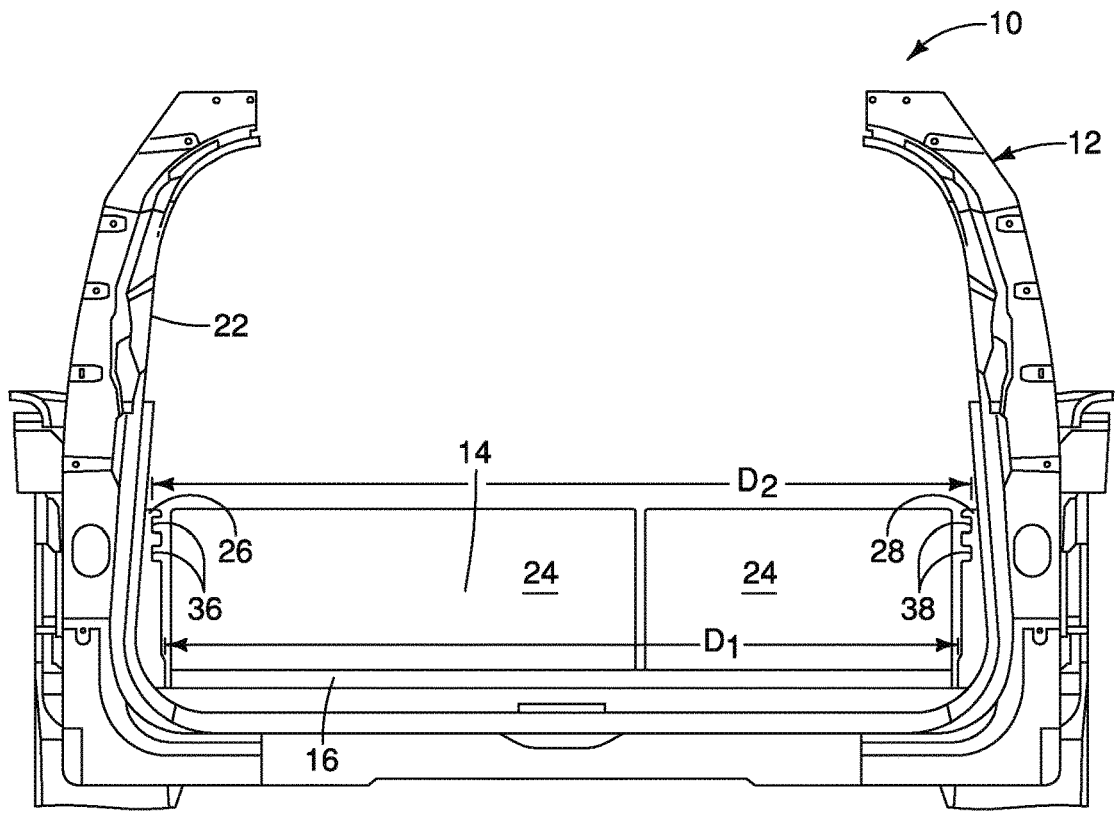
FIG. 4 is another rear view of the portions of the vehicle body structure similar to FIGS. 2 and 3 showing the panel installed between the first and second wall portions in a stowed orientation in accordance with the first embodiment.

As shown in FIGS. 2, 3 and 4, the first wall portion 26 and the second wall portion 28 are spaced apart from one another by a first distance $D_1$. The panel 16 is removably retained by the first wall portion 26 and the second wall portion 28 in a shelf orientation (horizontal orientation) shown in FIG. 2, a vertical orientation (vertical or upright orientation) shown in FIG. 3 and a stowed orientation, as shown in FIG. 4. The plurality of orientations of the panel 30 are described further below.

Figure 6:
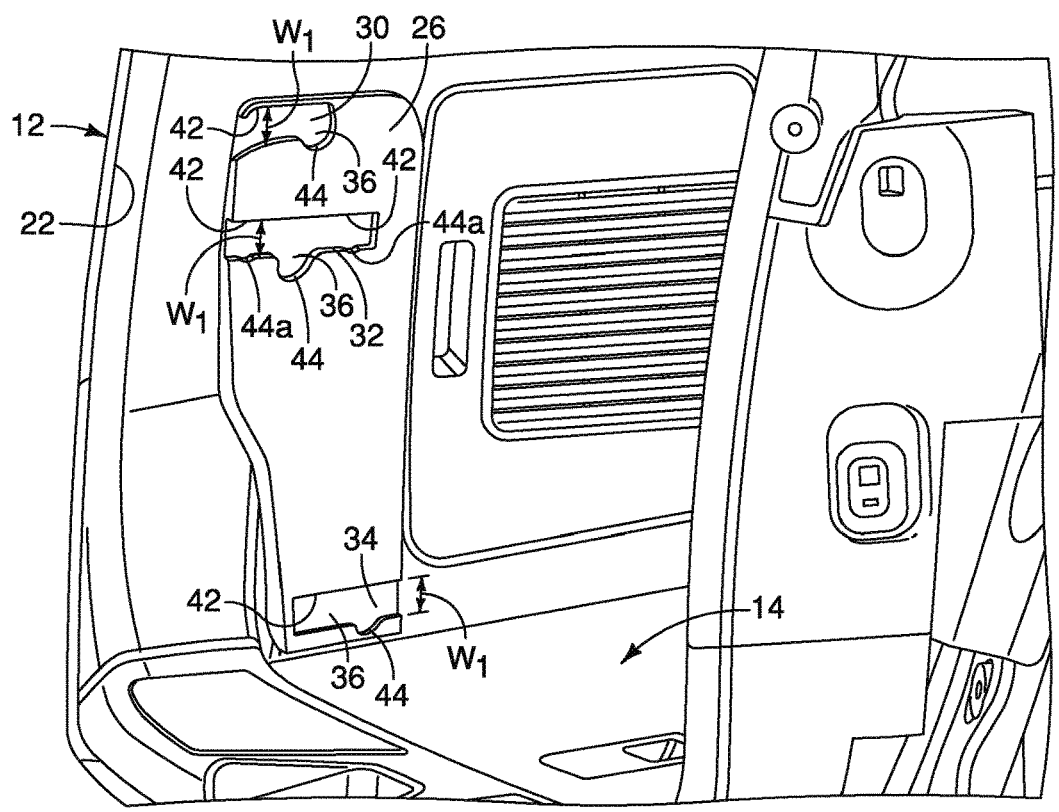
FIG. 6 is another perspective view of the portion of the cargo area shown in FIGS. 3, 4 and 5, with the panel removed showing a first slot, a second slot and a stowing slot of the first side wall portion in accordance with the first embodiment.
Figure 7:
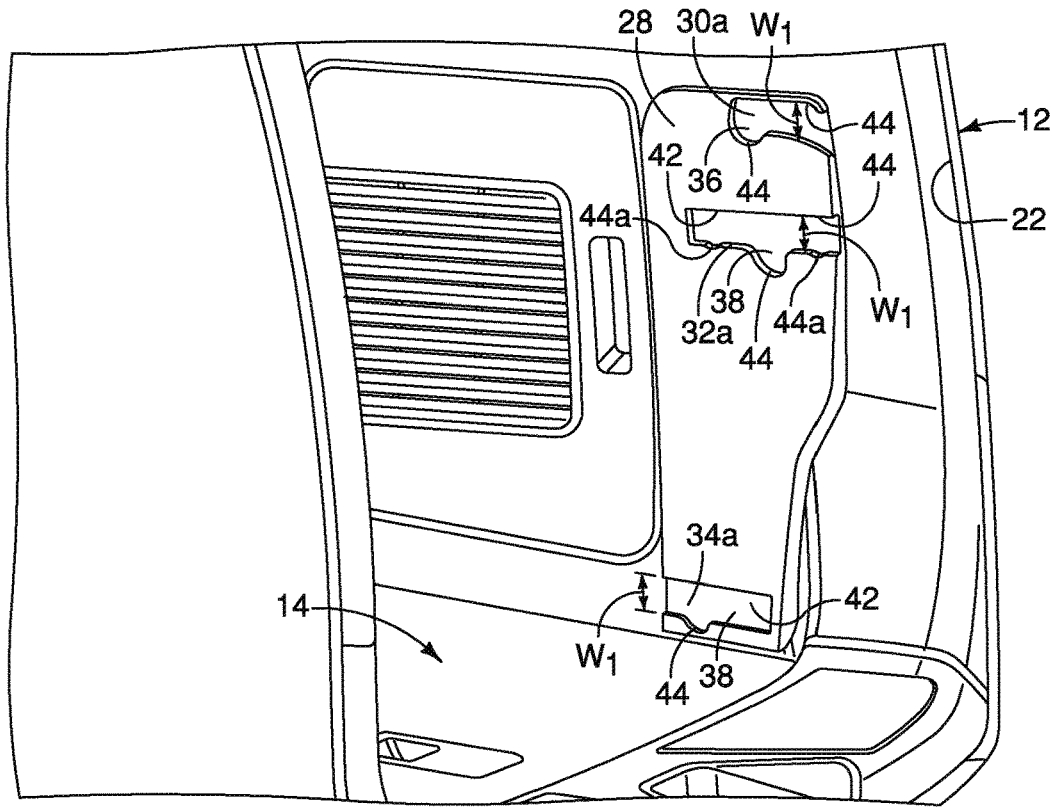
FIG. 7 is a perspective view of a portion of the cargo area showing a first slot, a second slot and a stowing slot defined along the second wall portion in accordance with the first embodiment.
Figure 8:
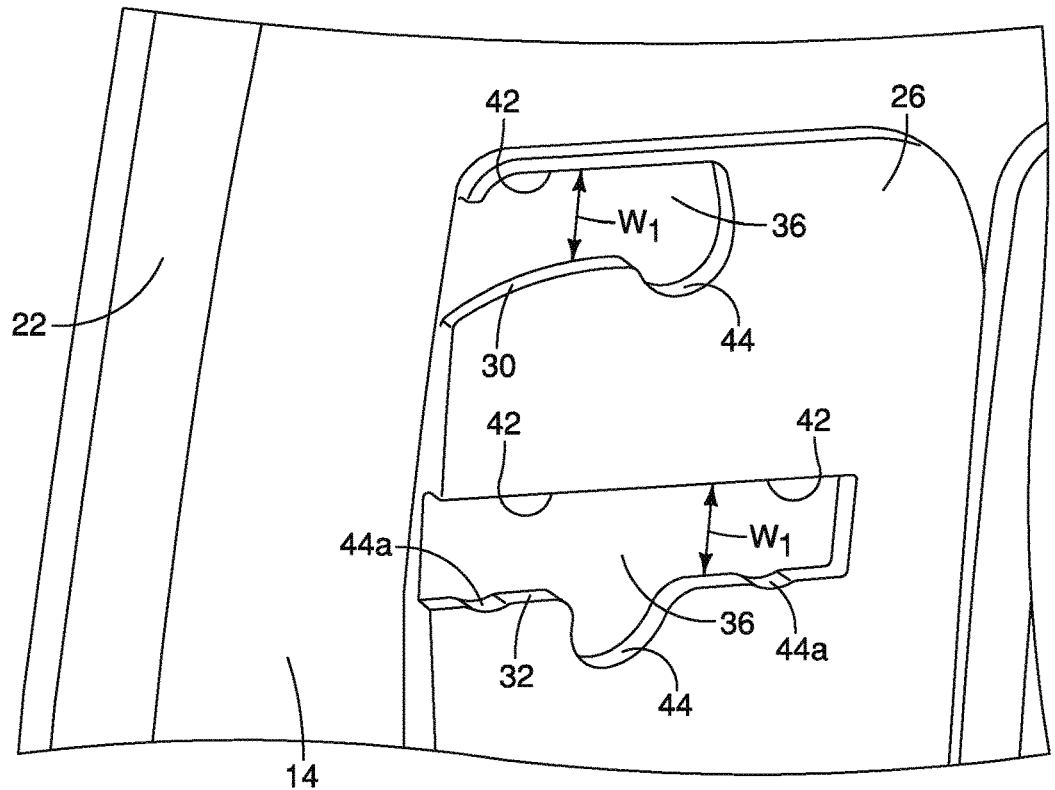
FIG. 8 is a perspective view of the first wall portion showing details of the first slot and the second slot in accordance with the first embodiment.
Figure 9:
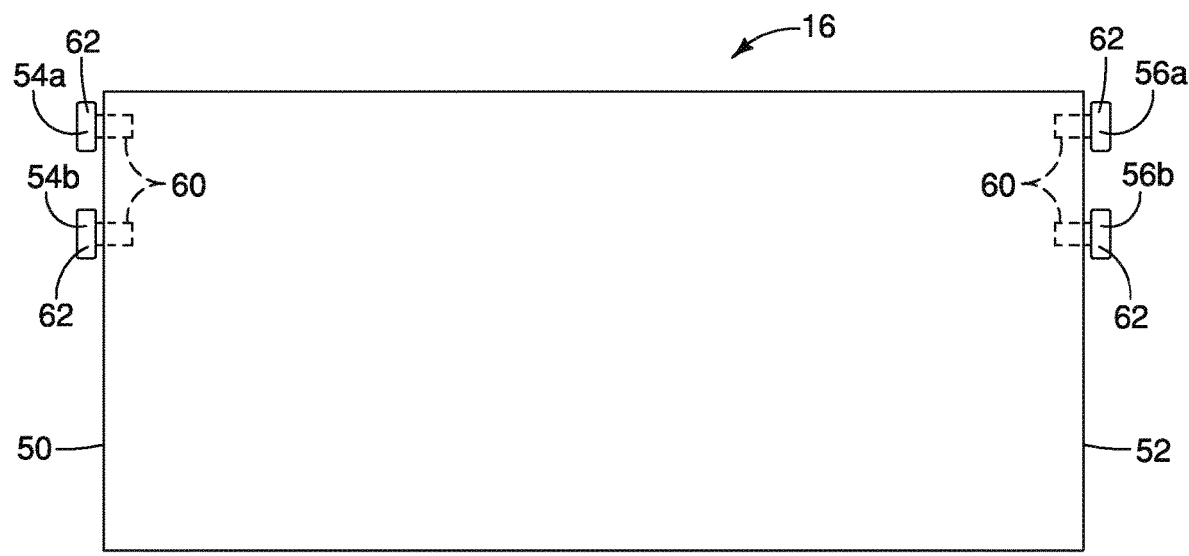
FIG. 9 is a rear view of the panel removed from the cargo area, the panel having a first end with a first pair of projections and a second end with a second pair of projections in accordance with the first embodiment.
Figure 10:
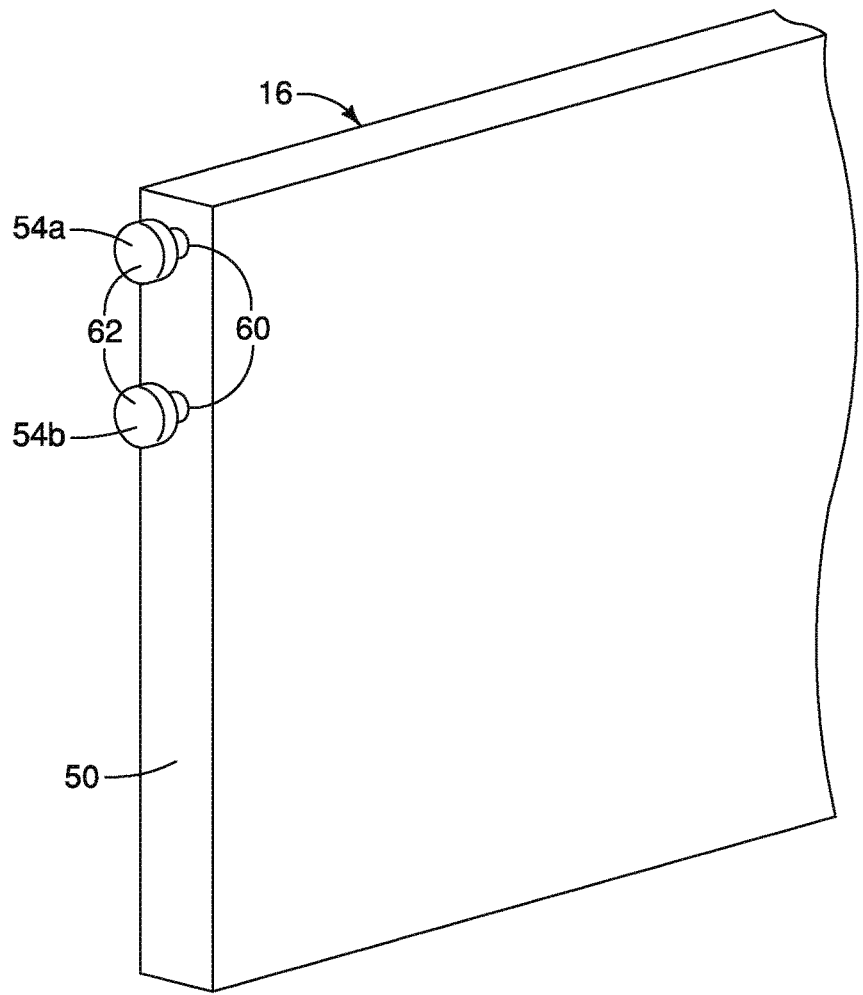
FIG. 10 is a perspective view of the first end of the panel showing details of the first pair of projections in accordance with the first embodiment.

As shown in FIGS. 5-6 and 8, the first wall portion 26 defines a first slot 30, a second slot 32 and a stowing slot 34. As shown in FIG. 7, the second wall portion 28 defines a first slot 30a, a second slot 32a and a stowing slot 34a.

The first wall portion 26 and the second wall portion 28 are identical to one another, except that they are mirror images of one another, as demonstrated by comparing FIGS. 6 and 7. Therefore, description of the first wall portion 26 herein applies equally to the second wall portion 28. Further, the first slot 30 and the first slot 30a are identical except that they are mirror images of one another. Further, first slot 30 and first slot 30a are aligned with one another. Similarly, the second slot 32 and the second slot 32a are identical except that they are mirror images of one another. Further, the second slot 32 and the second slot 32a are aligned with one another. As well, the stowing slot 34 and the stowing slot 34a are identical except that they are mirror images of one another. Further, the stowing slot 34 and the stowing slot 34a are aligned with one another.

Each of the first slot 30, the second slot 32 and the stowing slot 34 in the first wall portion 26 has corresponding recessed surfaces 36 that are all co-planar. Similarly, each of the first slot 30a, the second slot 32a and the stowing slot 34a in the second wall portion 28 has corresponding co-planar recessed surfaces 38. A distance $D_2$ measured between the recessed surfaces 36 and the recessed surfaces 38 is greater than the distance $D_1$.

Since the first wall portion 26 and the second wall portion 28 are identical, except that they are mirror images of one another, only the first wall portion 26, the first slot 30, the second slot 32 and the stowing slot 34 are described herein below, for the sake of brevity. However, it should be understood from the drawings and the description of the first slot 30 applies equally to the first slot 30a, description of the second slot 32 applies equally to the second slot 32a, and description of the stowing slot 34 applies equally to the stowing slot 34a.

Further, it should be understood from the drawings and the description herein that the first slot 30a in the second wall portion 28 is also referred to as a third slot and the second slot 32a in the second wall portion 28 is also referred to as a fourth slot.

A further description of the slots 30, 30a, 32, 32a, 34 and 34a is now provided with specific reference to FIGS. 6-9. Each of the first slots 30 and 30a, the second slots 32 and 32a and the stowing slots 34 and 34a has main sections 42 and a retaining section 44. The main sections 42 define an overall vertical width $W_1$. The retaining sections 44 each have a curved shape defining an overall width that is greater than the width $W_1$.

Further, the main sections 42 of each of the first slot 32 and the first slot 32a have an overall curved contour. The main sections 42 of each of the second slot 34 and the second slot 34a have an overall linear shape or contour.

Figure 12:
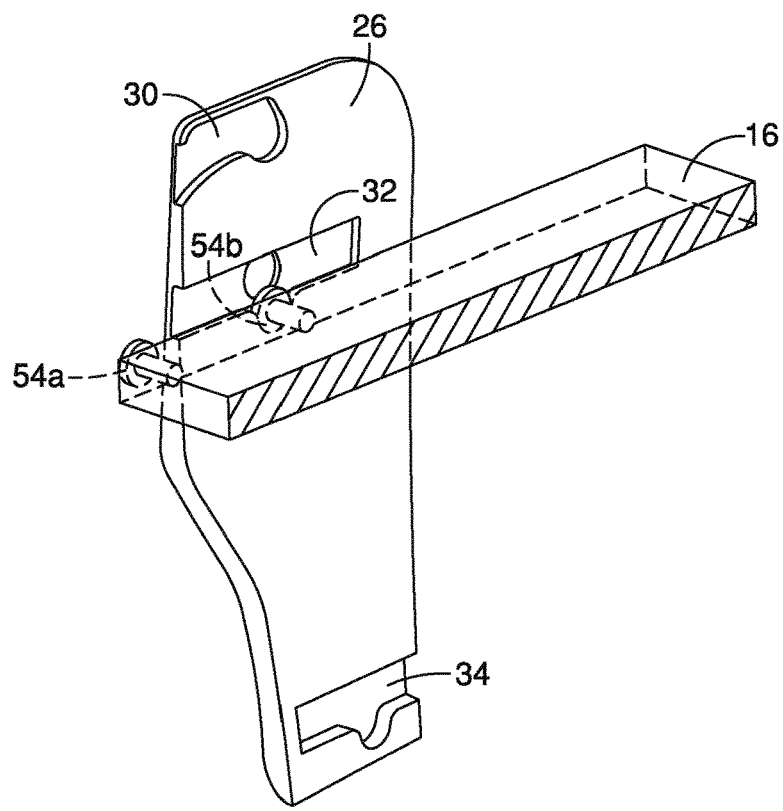
FIG. 12 is another perspective view of the first wall portion showing one of the first pair of projections of the panel partially removed from the second slot of the first wall portion in accordance with the first embodiment.
Figure 13:
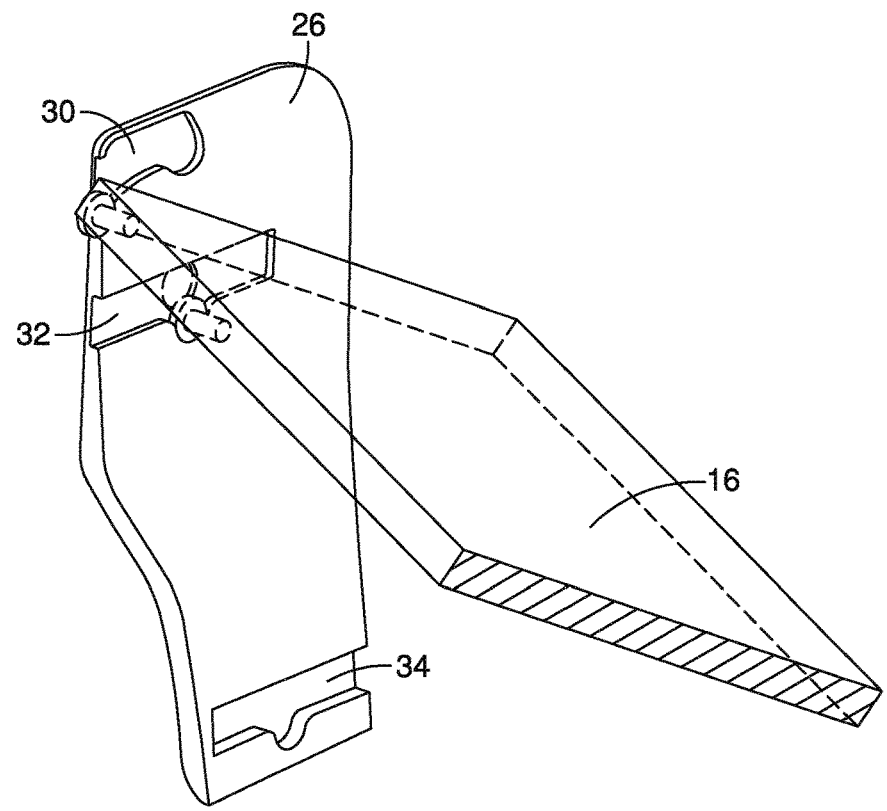
FIG. 13 is another perspective view of the first wall portion showing the upper one of the first pair of projections of the panel completely removed from the second slot of the first wall portion and about to be installed in the first slot in accordance with the first embodiment.
Figure 14:
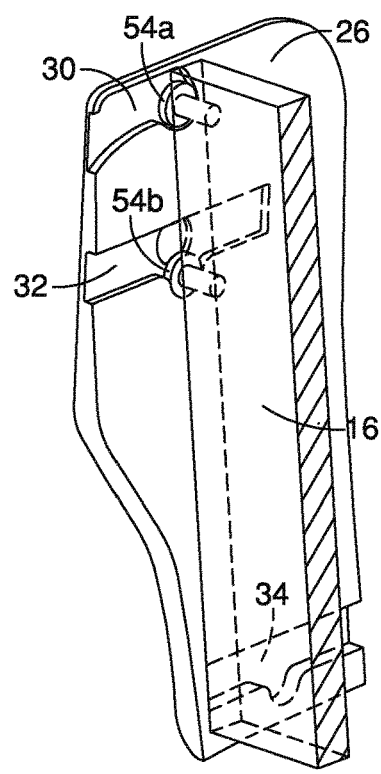
FIG. 14 is yet another perspective view of the first wall portion showing the upper one of the first pair of projections of the panel installed in the first slot such that the panel is now in the upright or vertical orientation in accordance with the first embodiment.

A description of the panel 16 is now with initial reference to FIGS. 9-15. The panel 16 is a rectangular panel that has a first end 50 and a second end 52 opposite the first end 50. The first end 50 has a first pair of projections 54a and 54b extending therefrom. The second end 52 has a second pair of projections 56a and 56b extending therefrom. With the panel 16 in an upright or vertical orientation, as shown in FIGS. 3 and 14, the projection 54a is positioned above the projection 54b. Similarly, the projection 56a is positioned above the projection 56b. In other words, one of the first pair of projections 54a and 54b is located above the other projection, and one of the second pair of projections 56a and 56b is located above the other of the pair of projections of the second pair of projections 56a and 56b.

Each of the first pair of projections 54a and 54b and the second pair of projections 56a and 56b include a shaft-like portion 60 and a runner portion 62. All the shaft-like portions are identical and all of the runner portions 62 are identical with identical overall dimensions. The shaft-like portions 60 are fixedly attached at corresponding locations to a corresponding one of the first end 50 and the second end 52. Each of the runner portions 62 has an outer width or diameter $W_2$ that is equal to or smaller than the overall width $W_1$ of each of the main sections of the first slots 30 and 30a, the second slots 32 and 32a and the stowing slots 34 and 34a.

Figure 11:
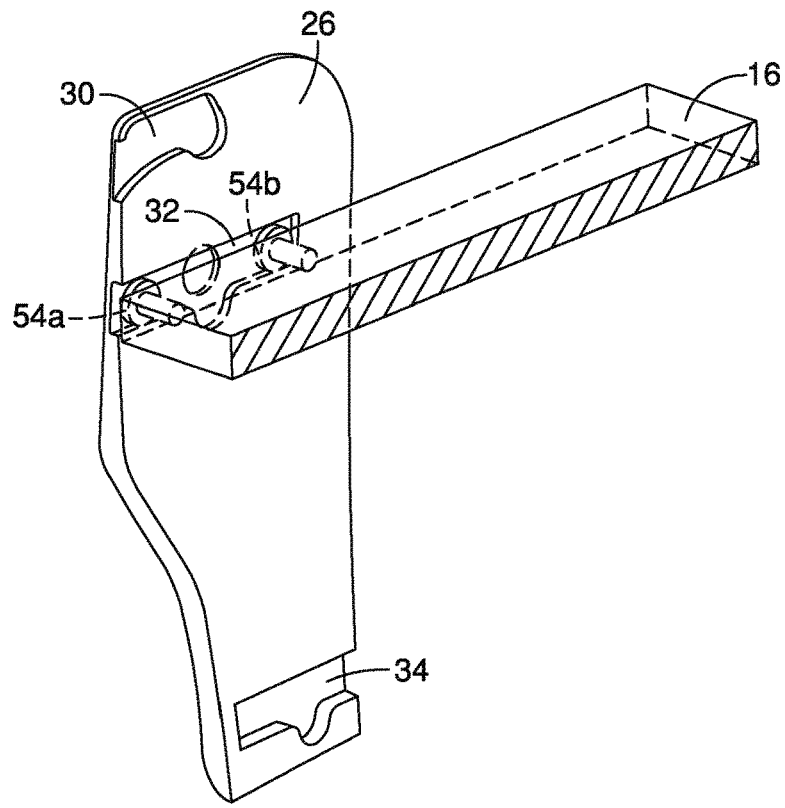
FIG. 11 is a perspective view of the first wall portion showing the first pair of projections installed to the second slot of the first wall portion with the panel being in the horizontal or shelf orientation in accordance with the first embodiment.

The panel 16, the projections 54a. 54b, 56a and 56b are dimensioned and shaped such that with the panel 16 installed between the first wall portion 26 and the second wall portion 28 in a shelf or horizontal orientation, the projection 54a and the projection 54b are located within the second slot 32 and projection 56a and 56b are also located within the second slot 32a, as shown in FIGS. 2 and 11. In the shelf or horizontal orientation, the projections 54a, 54b, 56a and 56b are located in respective main sections 42 of corresponding slots 32 and 32a, as shown in FIG. 11. The projections 54a, 54b, 56a and 56b rest in retaining sections 44a shown in FIGS. 6, 7 and 8.

Since the slots 32 and 32a are identical mirror images of one another, only the slot 32 is shown in FIG. 11 but is a representation of the slot 32a.

In order to move the panel 16 from the shelf or horizontal orientation, a vehicle passenger or operator moves the panel 16 rearward until the projection 54a (and 56a) are no longer within the slot 32 (and slot 32a), as shown in FIG. 12. The panel 16 is then pivoted about the projection 54b (and 56b) until the projection 54a (and 56a) align with the slot 30 (and 30a), as shown in FIG. 13. There after the panel 16 is further pivoted about the projection 54b (and 56b) and slid until the projection 54b (and 56b) is positioned in the retaining section 44 of the second slot 32 (and 32a) and the projection 54a (and 56a) are positioned in the retaining section 44 of the first slot 30 (and 30a), as shown in FIG. 14. Hence, FIGS. 3 and 14 shows the panel 16 in the upright or vertical orientation.

Figure 15:
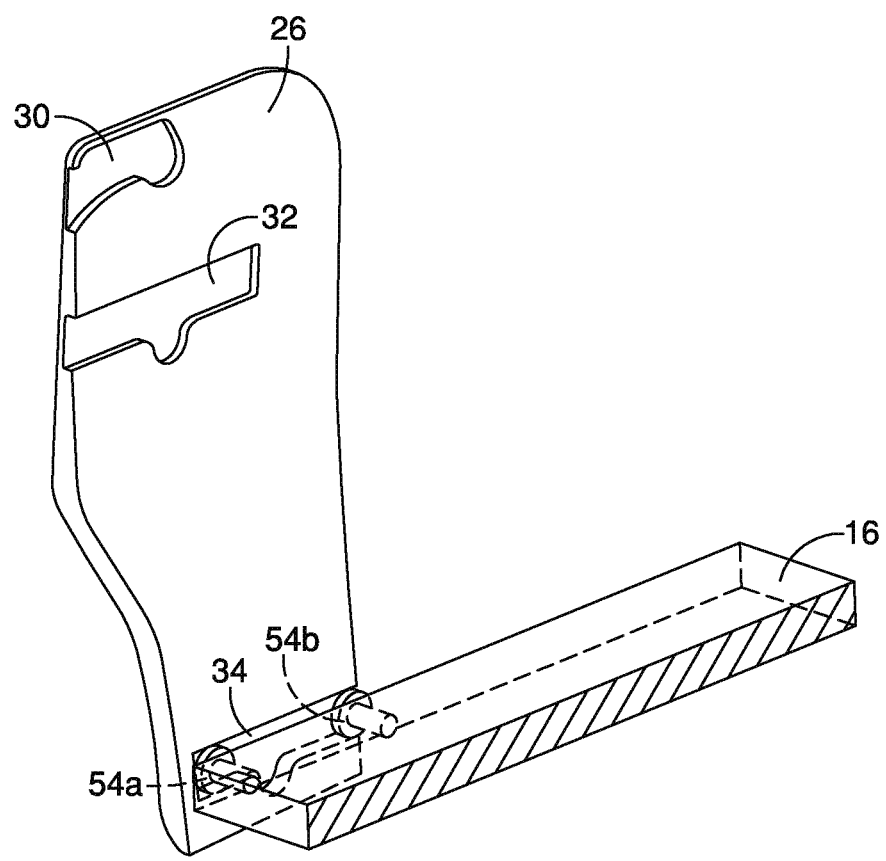
FIG. 15 is yet another perspective view of the first wall portion showing the first pair of projections of the panel installed in the stowing such that the panel is now in stowed orientation in accordance with the first embodiment.

FIGS. 4 and 15 show the panel 16 moved to a stowed orientation with the projections 54a and 54b (and projections 56a and 56b) inserted into the stowing slot 34 (and stowing slot 34a) as shown in FIGS. 4 and 15.

As described above, the second slots 32 and 32a are dimensioned and shaped to retain the corresponding one of the first pair of projections 54a and 54b and the second pair of projections 56a and 56b, respectfully, in the upright or vertical orientation. Further, the retaining sections 44 of the first and second slots 30, 30a. 32 and 32a are dimensioned and shaped to retain the corresponding ones of the projections 54a, 56a. 54b and 56b such that the panel 16 is retained in the upright or vertical orientation.

The various structural features of the vehicle 10 (other than those described above with respect to the cargo area 14) are conventional components that are well known in the art. Since these various structural features are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward". "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially". "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   a vehicle cargo area structure having a first wall portion and a second wall portion, the first wall portion and the second wall portion being spaced apart from one another by a first distance, the first wall portion defining a first pair of slots, the second wall portion defining a second pair of slots, recessed surfaces defined within the first pair of slots being a second distance away from recessed surfaces defined within the second pair of slots, the second distance being larger than the first distance; and
   a panel defining a first end and a second end opposite the first end, the first end having a first pair of projections extending therefrom, the second end having a second pair of projections extending therefrom, the panel and the first and second pair of projections being dimensioned and shaped such that the first and second pairs of projections of the panel are removably installed within at least one of the first pair of slots and the second pair of slots in a plurality of orientations including a horizontal orientation and an upright orientation.

2. The vehicle body structure according to claim 1, wherein
   each of the first pair of slots and the second pair of slots include main sections thereof that define an overall first width; and
   each of the first pair of projections and the second pair of projections include a shaft-like portion and a runner portion, the shaft-like portions being fixedly attached to corresponding ones of the first end and the second end, and each of the runner portions has an outer diameter that is equal to the overall width of each of the main sections of the first pair of slots and the second pair of slots.

3. The vehicle body structure according to claim 2, wherein
   the first pair of slots and the second pair of slots are aligned with one another.

4. The vehicle body structure according to claim 3, wherein
   a first one of each of the first pair of slots and a first one of the second pair of slots an overall arcuate shape.

5. A vehicle body structure, comprising:
   a vehicle cargo area structure having a first wall portion and a second wall portion with a cargo area defined therebetween, the first wall portion and the second wall portion being spaced apart from one another by a first distance, the first wall portion defining a first slot and a second slot, the second wall portion defining a third slot and a fourth slot, recessed surfaces defined within the first and second slots being a second distance away from recessed surfaces defined within the third and fourth slots, the second distance being larger than the first distance; and
   a panel defining a first end and a second end opposite the first end, the first end having a first pair of projections extending therefrom, the second end having a second pair of projections extending therefrom, the panel being dimensioned and shaped such that with the panel installed between the first wall portion and the second wall portion in an upright orientation, one of the first pair of projections is located within the first slot and the other of the first pair of projections is located within the second slot, and with the panel installed between the first wall portion and the second wall portion in a horizontal orientation, the one of the first pair of projections is located within the second slot and the other of the first pair of projections is located within the second slot.

6. The vehicle body structure according to claim 5, wherein the panel is dimensioned and shaped such that with the panel installed between the first wall portion and the second wall portion in the upright orientation, one of the second pair of projections is located within the third slot and the other of the second pair of projections is located within the fourth slot, and with the panel installed between the first wall portion and the the second wall portion in the horizontal orientation, the one of second pair of projections is located within the fourth slot and the other of the second pair of projections is located within the fourth slot.

7. The vehicle body structure according to claim 5, wherein each of the first, second, third and fourth slots includes main sections thereof that define an overall first width; and each of the first pair of projections and the second pair of projections includes shaft-like portion and a runner portion, the shaft-like portions being fixedly attached to corresponding ones of the first end and the second end, and each of the runner portions has an outer diameter that is equal to or smaller than the overall width of each of the main sections of the first, second, third and fourth slots.

8. The vehicle body structure according to claim 7, wherein the first and third slots are aligned with one another, and the second and fourth slots are aligned with each other.

9. The vehicle body structure according to claim 8, wherein each of the first and third slots includes a corresponding one of the main sections and a retaining section, the main sections having an overall arcuate shape, with the retaining sections being dimensioned and shaped to retain the corresponding one of the first pair of projections and the second pair of projections with the panel in the upright orientation.

10. The vehicle body structure according to claim 9, wherein each of the second and fourth slots includes a corresponding one of the main sections and a retaining section, the main sections having an overall linear shape, with the retaining section being dimensioned and shaped to retain the corresponding other of the first pair of projections and the second pair of projections with the panel in the upright orientation.

11. The vehicle body structure according to claim 10, wherein each of the one of the first pair of projections and the second pair of projections is located above the other of the first pair of projections and the second pair of projections.

12. The vehicle body structure according to claim 5, wherein the first and third slots are aligned with one another, and the second and fourth slots are aligned with each other.

13. The vehicle body structure according to claim 12, wherein each of the first and third slots includes a main section and a retaining section, the main sections having an overall arcuate shape, with the retaining section being dimensioned and shaped to retain corresponding ones of the first pair of projections and the second pair of projections with the panel in the upright orientation.

14. The vehicle body structure according to claim 13, wherein each of the second and fourth slots includes a main section and a retaining section, the main sections having an overall linear shape, with the retaining section being dimensioned and shaped to retain corresponding other ones of the first pair of projections and the second pair of projections with the panel in the upright orientation.

\* \* \* \* \*